US008249912B2

(12) United States Patent
Elliott et al.

(10) Patent No.: US 8,249,912 B2
(45) Date of Patent: Aug. 21, 2012

(54) METHOD FOR DETERMINING, CORRELATING AND EXAMINING THE CAUSAL RELATIONSHIPS BETWEEN MEDIA PROGRAM AND COMMERCIAL CONTENT WITH RESPONSE RATES TO ADVERTISING AND PRODUCT PLACEMENT

(75) Inventors: Sebastian Elliott, Greenwich, CT (US); Jonathan Takiff, West Simsbury, CT (US)

(73) Assignee: Sebastian Elliot, Greenwich, CT (US)

( * ) Notice: Subject to any disclaimer, the term of this patent is extended or adjusted under 35 U.S.C. 154(b) by 1173 days.

(21) Appl. No.: 12/070,747

(22) Filed: Feb. 20, 2008

(65) Prior Publication Data

US 2009/0210290 A1  Aug. 20, 2009

(51) Int. Cl.
*G06Q 10/00* (2012.01)
(52) U.S. Cl. ...................................... 705/7.29
(58) Field of Classification Search .................. 705/7.29
See application file for complete search history.

(56) References Cited

U.S. PATENT DOCUMENTS

| | | | |
|---|---|---|---|
| 4,745,549 A | 5/1988 | Hashimoto | |
| 5,227,874 A | 7/1993 | Von Kohorn | |
| 5,848,396 A * | 12/1998 | Gerace | 705/7.33 |
| 6,134,531 A | 10/2000 | Trewitt et al. | |
| 6,216,129 B1 | 4/2001 | Eldering | |
| 6,233,564 B1 | 5/2001 | Schulze, Jr. | |
| 6,236,977 B1 | 5/2001 | Verba et al. | |
| 6,285,818 B1 | 9/2001 | Suito et al. | |
| 6,286,005 B1 | 9/2001 | Cannon | |
| 6,297,853 B1 | 10/2001 | Sharir et al. | |
| 6,298,328 B1 | 10/2001 | Healy et al. | |
| 6,330,554 B1 | 12/2001 | Altschuler et al. | |
| 6,338,043 B1 | 1/2002 | Miller | |
| 6,353,929 B1 | 3/2002 | Houston | |
| 6,374,227 B1 | 4/2002 | Ye | |
| 6,385,590 B1 | 5/2002 | Levine | |
| 6,389,429 B1 | 5/2002 | Kane et al. | |
| 6,405,173 B1 | 6/2002 | Honarvar et al. | |
| 6,416,155 B1 | 7/2002 | Takahashi et al. | |
| 6,430,539 B1 | 8/2002 | Lazarus et al. | |
| 6,529,878 B2 | 3/2003 | De Rafael et al. | |
| 6,718,551 B1 | 4/2004 | Swix et al. | |
| 6,807,675 B1 | 10/2004 | Maillard et al. | |
| 6,820,277 B1 | 11/2004 | Eldering et al. | |
| 6,859,936 B2 | 2/2005 | Makowski, Jr. et al. | |

(Continued)

OTHER PUBLICATIONS

"Modeling the clickstream: Implications for web-based advertising efforts"[PDF] from jstor.org,P Chatterjee, DL Hoffman . . . —Marketing Science, 2003—JSTOR.*

(Continued)

*Primary Examiner* — Jonathan G Sterrett
(74) *Attorney, Agent, or Firm* — Zarley Law Firm, P.L.C.

(57) ABSTRACT

A method of determining correlations and causality between media program content and consumer responsiveness involves identifying and storing media and commercial program time occurrence and content information and consumer media reviewing actions which occur in connection with the media and commercial program time occurrence and content information. The information is correlated to obtain and assign responsiveness probability values corresponding to type and intensity of consumer response for each of the media and commercial program time occurrence and content information. These responsiveness probability values are then applied to a second media program to place product advertising at a specific time within specific content therein as determined by the responsiveness probability values thus facilitating creation of new ads and modification of existing ones and further, directing placement of those advertisements within any and all broadcast and Internet media programming.

20 Claims, 7 Drawing Sheets

U.S. PATENT DOCUMENTS

| | | | |
|---|---|---|---|
| 6,944,877 B1 | 9/2005 | Lord et al. | |
| 6,988,277 B2 | 1/2006 | Kovac et al. | |
| 7,028,071 B1 | 4/2006 | Slik | |
| 7,031,932 B1* | 4/2006 | Lipsky et al. | 705/14.41 |
| 7,051,351 B2 | 5/2006 | Goldman et al. | |
| 7,100,183 B2 | 8/2006 | Kunkel et al. | |
| 7,124,093 B1* | 10/2006 | Graham et al. | 705/14.41 |
| 7,136,871 B2 | 11/2006 | Ozer et al. | |
| 7,162,432 B2 | 1/2007 | Mascarenhas | |
| 7,185,353 B2 | 2/2007 | Schlack | |
| 7,194,421 B2 | 3/2007 | Conkwright et al. | |
| 7,197,472 B2 | 3/2007 | Conkwright et al. | |
| 7,206,754 B1 | 4/2007 | Spector | |
| 7,370,002 B2* | 5/2008 | Heckerman et al. | 705/14.41 |
| 7,406,434 B1* | 7/2008 | Chang et al. | 705/14.43 |
| 7,415,423 B2* | 8/2008 | Ranka et al. | 705/14.41 |
| 7,949,561 B2* | 5/2011 | Briggs | 705/14.41 |
| 2003/0093311 A1 | 5/2003 | Knowlson | |
| 2003/0172376 A1 | 9/2003 | Coffin, III | |
| 2003/0229531 A1* | 12/2003 | Heckerman et al. | 705/10 |
| 2004/0163101 A1 | 8/2004 | Swix et al. | |
| 2004/0204975 A1* | 10/2004 | Witting | 705/7 |
| 2005/0246734 A1 | 11/2005 | Kover et al. | |
| 2005/0251824 A1 | 11/2005 | Thomas et al. | |
| 2006/0004622 A1 | 1/2006 | Fanelli et al. | |
| 2006/0089880 A1* | 4/2006 | Merriman et al. | 705/14 |
| 2006/0168616 A1 | 7/2006 | Candelore | |
| 2006/0212900 A1 | 9/2006 | Ismail et al. | |
| 2006/0271953 A1 | 11/2006 | Jacoby et al. | |
| 2006/0282328 A1 | 12/2006 | Gerace et al. | |
| 2007/0011039 A1 | 1/2007 | Oddo | |
| 2007/0033094 A1 | 2/2007 | Hartselle | |
| 2007/0061837 A1 | 3/2007 | Dadush | |
| 2007/0061838 A1 | 3/2007 | Grubbs et al. | |
| 2007/0073568 A1 | 3/2007 | Kobayashi | |
| 2007/0083887 A1 | 4/2007 | Gutta et al. | |
| 2007/0089125 A1 | 4/2007 | Claassen | |
| 2007/0089128 A1 | 4/2007 | Makowski, Jr. et al. | |

OTHER PUBLICATIONS

Which ad works, when, where, and how often? Modeling the effects of direct television advertising [PDF] from umn.eduGJ Tellis, RK Chandy . . . —Journal of Marketing . . . , 2000—Am Marketing Assoc.*

A discrete optimization model for seasonal merchandise planning SA Smith, N Agrawal . . . —Journal of Retailing, 1998—Elsevier.*

"Consumers, characters, and products: A balance model of sitcom product placement effects"[PDF] from classmatandread.net, CA Russell, BB Stern . . . —Journal of Advertising, 2006—ME Sharpe.*

"Low-involvement learning: Memory without evaluation", [PDF] from jstor.org SA Hawkins . . . —Journal of consumer research, 1992—JSTOR.*

The Death of the 30-Second Commercial [PDF] from thelavinagency.comA Kishore—Media & Entertaiment Strategies, 2003—thelavinagency.com.*

Encounters with consumption during computer-mediated play: the development of digital games as marketing communication media[PDF] from psu.eduM Molesworth—Proceedings of the First Digital Games Research . . . , 2003—Citeseer.*

"Influence of stimulus symmetry and complexity upon haptic scanning strategies during detection, learning, and recognition tasks", PJ Locher . . . —Attention, Perception, & Psychophysics, 1978—Springer.*

Audience Response to Product Placements: An Integrative Framework and Future . . . Siva K Balasubramanian; James A Karrh; Hemant Patwardhan Journal of Advertising; Fall 2006; 35, 3; ABI/INFORM Global.*

* cited by examiner

FIG. 6

METHOD FOR DETERMINING, CORRELATING AND EXAMINING THE CAUSAL RELATIONSHIPS BETWEEN MEDIA PROGRAM AND COMMERCIAL CONTENT WITH RESPONSE RATES TO ADVERTISING AND PRODUCT PLACEMENT

BACKGROUND OF THE INVENTION

1. Technical Field

The present invention relates generally to methods for correlating program content and advertising and, more particularly, to a method of determining correlations and causality between media program and commercial content and consumer responsiveness which involves identifying and storing media and commercial program time occurrence and content information and consumer media reviewing actions which occur in connection with the media and commercial program time occurrence and content information, correlating that information to obtain and assign responsiveness probability values corresponding to type and intensity of consumer response for each of the media and commercial program time occurrence and content information, then applying those responsiveness probability values to a second media program to place product and service advertising at a specific time within specific content therein as determined by the responsiveness probability values.

2. Description of the Priority Art

It is well-known that certain types of television programming appeal to certain types of television viewers. For example, the types of viewers who will watch a "Matlock" rerun will be a very different demographic than those that watch the "Ultimate Fighting Championship," and, of course, the type of advertising shown during those two shows would be quite different also to appeal to the expected viewers. This type of viewer information has been long-available and has been used for many years to direct the placement of advertising within the shows. However, this method of advertising placement does not always provide exceptional results, as there will always be elements of the programs which do not appeal to certain viewers and types of viewers, and elements of the programs which have increased appeal for certain viewers and types of viewers. Unfortunately, there are few methods by which the specific content of programs may be examined and weighted by their appeal, and those methods stop well short of the type and level of execution necessary to fully address this issue. There is therefore a need for a method of examining programs to identify specific elements therein to determine audience reaction to those specific elements.

Once those specific elements are known and the audience reaction to those elements is ascertained, it then should become theoretically possible to anticipate audience reaction to similar events in future programs. Additionally, it should be possible to examine previously aired programs and commercials to predict likely response to new advertisements or explain why certain advertising campaigns did or did not work using those same shows. Advertising and product placements may then theoretically be focused on those specific elements to increase the "bang" for the advertiser's buck, in other words, the same element occurring in the future program will likely produce the same or similar reaction and therefore the advertising best suited to appeal to the particular audience given the expected audience reaction occurring at that time in the program would be placed at that point in the program. As a corollary to this it is also probable that by using more of the same element that was seen to work previously one could yield better results than otherwise. However, at this time, not a single example is found in the prior art which addresses and solves this need.

For example, some of the more relevant prior art includes technology which attempts to categorize a viewer based on the types of shows he watches, as well as demographic information and indicated preferences. By way of example, Predictive Networks, Inc. has previously used this system for targeting Internet users and is attempting to and sought to adapt it for interactive television. The system places users at specific points in an X/Y axis, x being education, y being income. For example, an individual who visits Textbooks.com will be placed in a high education, low-income point on the graph. These events are collected over time so that advertisements can be sent to viewers whom the manufacturer feels represent the correct target audience.

Most other personalization techniques try to categorize each viewer into a given profile based on a number of preferences exhibited by the viewer. These may be collected through surveys, responses to product offers, etc. Thus, their likelihood of accepting or not accepting an advertisement is based on how they have been categorized, or how they have previously responded. This "personalized" advertising utilizes several different types of collaborative filtering, and these include such approaches as illustrated below.

Companies will track the types of programs a consumer watches. Based on the types of shows, they identify the types of advertisements the individual may want to see. For example, someone who watches sports shows often might receive an advertisement for sports apparel. This is part of the intended nature of "targeted" advertisements . . . two neighbors who are watching the same show may receive different commercials. This program data is combined with data such as demographic information concerning the consumer, or preferences indicated by the consumer through surveys and questionnaires. Each of the currently operating companies which use these approaches has a slightly different approach, but each one has a "determination engine" or "matching engine" that determines, based on this data, which groups of individuals will receive given advertisements.

Another approach to advertising on television is "enhanced" advertising, which takes an existing advertisement and enhances it with an interactive "overlay". This is a digital graphic image placed over the existing advertisement, which usually offers the consumer a chance to buy the product, get more information about it, or enter a contest. These responses are collected and the names and addresses of the responders are sent to the manufacturer of the advertised product. However, none of the prior art specifically matches program and commercial content with consumer responses to product placements and advertising within and between the program down to time frames of only seconds, and does so using an easily applied and relatively straightforward mathematical formula.

Therefore, an object of the present invention is to provide an improved method of determining correlations and causality between media programs and commercial content and consumer responsiveness thereto.

Another object of the present invention is to provide an improved method of determining correlations and causality relationships between media program and commercial content and consumer responsiveness in which media and commercial program time occurrence and content information and consumer media actions are identified, detected and stored to provide a growing database of such information which is usable by the present invention.

Another object of the present invention is to provide an improved method of determining correlations and causality relationships between media program and commercial content and consumer responsiveness which can be used to identify likely time and content locations within media programs that selected desirable viewers will be watching the program, and then to place embedded advertising including scrolling graphics and texts and product placements in those locations to improve responsiveness to those ads.

Another object of the present invention is to provide an improved method of determining correlations and causality between media program and commercial content and consumer responsiveness which further predicts which content elements of the commercial's to use with what program content elements to gain the best response rate to the commercial, specifically, the method considers not just the content of the media program but also the content of the commercial and how that interplays with the media program.

Finally, an object of the present invention is to provide an improved method of determining correlations and causality between media program content and consumer responsiveness which is relatively simple and straightforward in design and furthermore is safe, efficient and effective in use.

SUMMARY OF THE INVENTION

The present invention discloses a method of determining correlations and causality between media program and commercial content and consumer responsiveness over time and over several types of shows and commercials including the steps of identifying and storing media and commercial program time occurrence and content information and detecting and storing consumer media reviewing actions in connection with the media and commercial program time occurrence and content information via consumer media reviewing detector means operative to selectively detect and store consumer media reviewing actions. The media and commercial program time occurrence and content information and the consumer media reviewing actions are then correlated to obtain and assign responsiveness probability values corresponding to type and intensity of consumer response for each of the media and commercial program time occurrence and content information. These responsiveness probability values are then applied to media and commercial program time occurrence and content information in a second media program to predict consumer media reviewing actions in response to the media and commercial program time occurrence and content information in the second media program. Finally; an advertisement which takes any form, is of any length, is interactive directly (offering an interactive link on your computer or remote of TV) or indirectly (for example, offering a phone number, or internet website) or is a product placement is placed within the second media program at a specific time within specific content therein as determined by the application of the responsiveness probability values to the media and commercial program time occurrence and content information in the second media program.

The present invention thus provides a substantial improvement over those advertising methods found, in the prior art. For example, because the present invention determines specific audience reactions to specific occurrences within the program, broken down to even minor occurrences, targeting of advertising may be accomplished with far more accuracy and with the likelihood of far better results. Also, because the database of the present invention is constantly being updated with viewer responses to improve the accuracy of the information stored therein, the method of the present invention permits continual modification and adjustment of the placement of the commercials within the media programs. Furthermore, although the present invention is designed primarily to work with television advertising, the present invention can be used in connection with all forms of media, including movies, radio and the Internet. Finally, because the present invention includes a predictive model designed to gauge response rates to interactive ads and a model to help media planners, creative directors, advertisers and so on, create ads, the placement of ads within the media program and the creating or reviewing of ads for placement is facilitated, and in either situation the present invention seeks to enhance the response rate to those advertisements. It is therefore seen that the present invention provides a substantial improvement over those advertising methods found in the prior art.

BRIEF DESCRIPTION OF THE DRAWINGS

FIG. 4 is a diagram showing examples of coupons and other interactive enhancements provided as part of the method of the present invention; and.

FIGS. 5, 6 and 7 are screenshots of the program embodying the present invention showing how various data points are entered and compared.

DESCRIPTION OF THE PREFERRED EMBODIMENT

Figure 1:
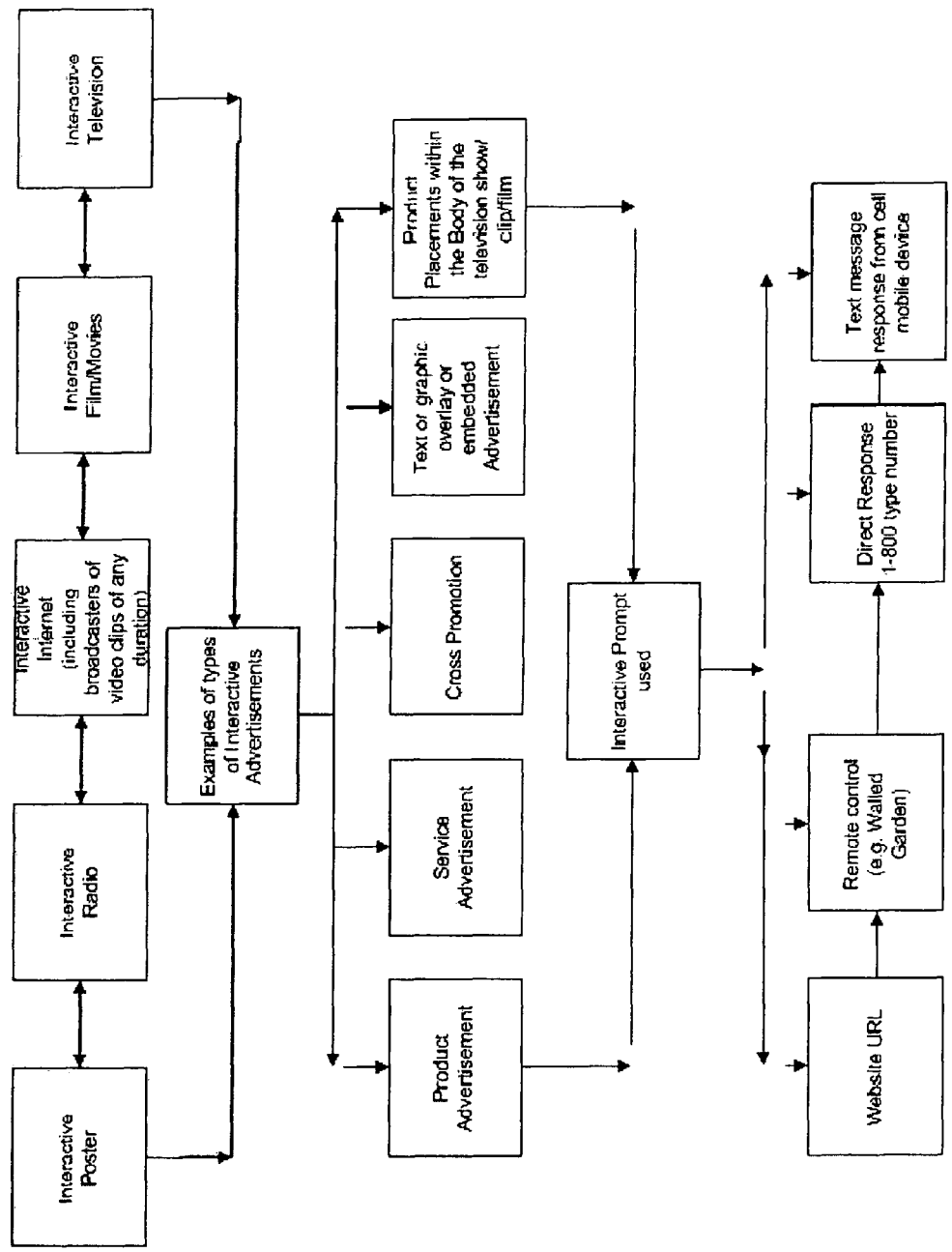
FIG. 1 is a general schematic diagram of the method of determining correlations and causality between media program content and consumer responsiveness of the present invention.

The system of the present invention is best shown generally in FIG. 1 as including a first database containing a plurality of information pertaining to each second or other time increment or theme or scene or other means of categorizing content of a select number of television shows gathered from different time periods. This database will contain both product elements and programming elements. Product or service elements are information directly associated with the product or service itself, and they attempt to directly create responsiveness and/or a positive association with the brand from the consumer. Programming elements concern information associated with the programming content that surrounds the commercials and/or product placement. These elements are indirectly responsible for creating responsiveness and positive association with commercials or product placements. By indirectly responsible, it is meant that the relationship that exists between a network's programming and its viewers can be leveraged by an advertiser hoping to also forge a relationship with those same viewers. Furthermore, both product and service and programming elements are broken down into factual and psychographic measures. Factual measures concern quantitative, unarguable data about the product or service or program or commercial, whereas psychographic measures are qualitative and require more judgement on the part of the data-entry operator; however, they are still categorizable. Finally, product placements (defined as promotions occurring during a show other than standard commercials) are further judged according to exposure variables. These are used to determine the publicity advantages one product placement may have over another.

It should be noted that throughout this disclosure, the term "advertisement" is used, and refers generally to any commercial, interactive ad, product placement, hyperlink or any other media display of a product or service which would be understood by the viewing public to constitute an advertisement of that product or service. This is important as the present invention is designed for use with many different types of media, not just television, as will be made clear in the subsequent disclosure materials.

All of these elements become independent (x) variables in the regression model of the present invention. They are then viewed in the context of viewer response in order to determine which elements have the most probability of creating responsiveness among certain groups, and the below description illustrates the breakdown of programming and commercial factual and psychographic elements. It should be noted that the following list is not exhaustive, nor is it meant to be, but rather is intended to provide specific examples of those elements which will be used and interpreted with the method of the present invention.

1. Program Elements—Factual
A) Time. Each celebrity (or special guest, or whomever or whatever is to be tracked using the method of the present invention) is measured by when they appear on screen during the duration of a show. Jennifer Anniston, for example, might appear in 5 minutes and 30 seconds of a fifteen minute segment. This can be measured with a stopwatch or any other appropriate timing device.
B) Focus. This measures how cluttered the screen is by different celebrities. For example, if Jennifer Anniston appears in seconds 1-5 by herself, her focus for each of those seconds is 1. If seconds 6-10 include her with 2 other characters, then their focus is each 0.33 for each of those seconds they are ell onscreen for. A celebrity is considered "onscreen" when their face is visible (of course if they were dressed in a ski mask and their covered face was shown that would be taken as visible).
C) Show. Simply the name of the show itself, and yet this information must be considered on a second-by-second or some other small time increment basis because viewers will switch channels often, and this will be known to set-top box providers (because of personalization technology).
D) Network. The same as with Show, in that each time the viewer returns to the network, the network name will be noticed by the viewer.
E) Show Type. Drama, comedy, talk show, etc.
F) Media type. Internet, other bandwidth conduit, mobile device, movie theater, and on and on.

There are other objective measurements, for example, what type of interactive prompts (Internet, direct response phone numbers, remote control interactivity, text messages, etc., etc.) and what type of enhancement is it, graphic overlay, flashing text, 2/5/10 etc. second ad, level of interactivity etc.; are combinations of offers being made, or combinations of enhancements.

Figure 4:
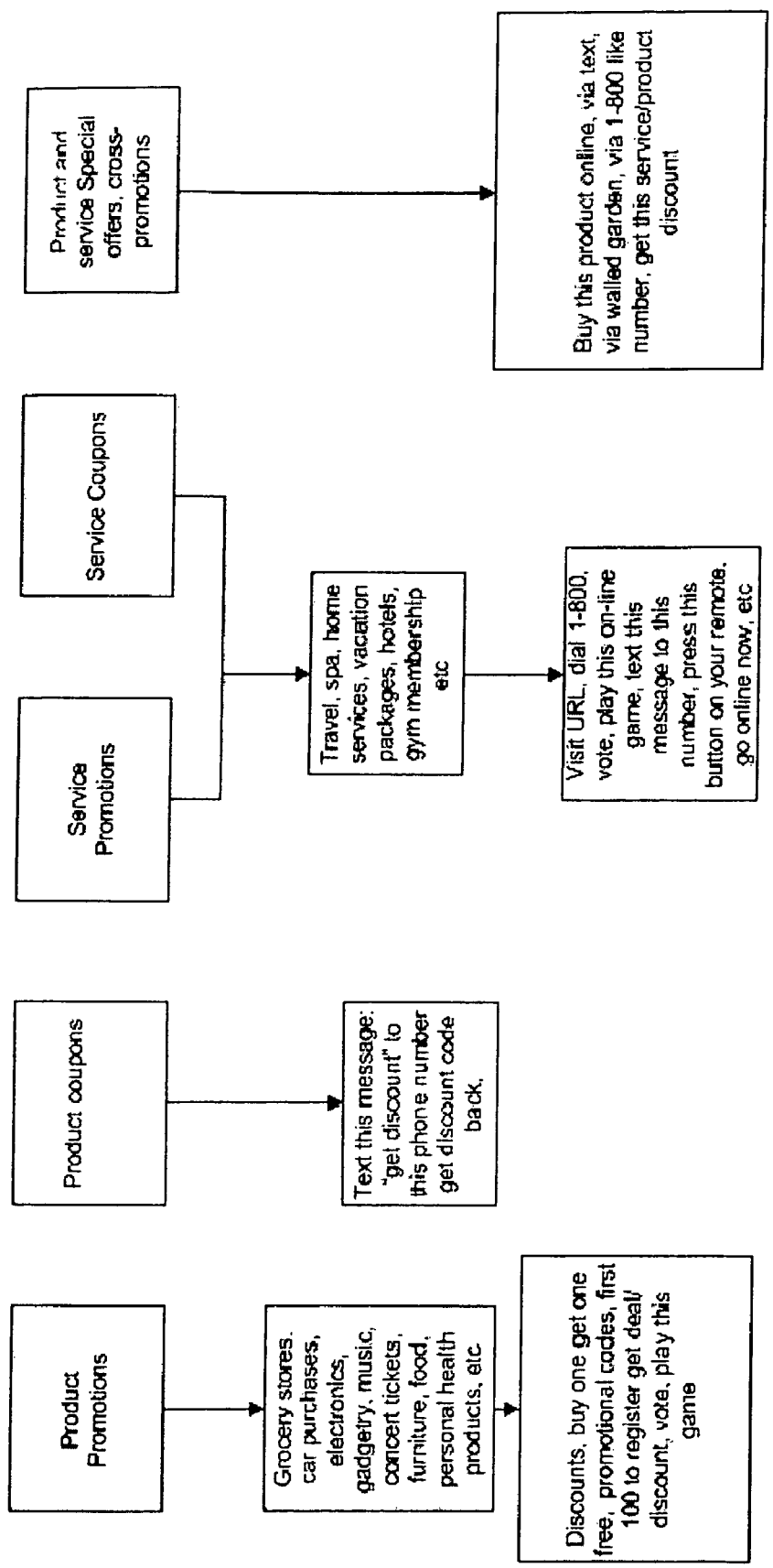

2. Program Elements—Psychographic
A). Scene type. Each scene type is recorded by second or theme (romantic, office dialogue, etc).
B) Character type. For example, quirky, comedic, etc.
3. Commercial/Product Placement Elements—Factual
A) Brand. What is the brand name?
B) Category—e.g., fast food, sports car, computer, etc.
C) Product Ratio—what percentage of the commercial/product placement actually contains a visual image of the product? (e.g. 70% as measured with stopwatch, etc.)
D) Existing product or New product?
E) Position. First ad in commercial break? Second? Third? Or last?
3. Commercial/Product Placement Elements—Psychographic
A) Background music. What style is the background music?
B) Appeal, M or F. Is this product meant to appeal to men, women, or both?
C) Celebrity spokesperson. Is there a celebrity spokesperson?Who? Character type?
D) Emphasis. What is the product placement or commercial emphasis? For example, is the commercial a "look good, feel good" type as used for gyms and workout equipment, "tastes good, good for you" type as used for low fat cereals and other such health foods, and many other types of commercials.
E) Enhancement emphasis. What does the interactive enhancement add to the commercial or product placement? For example, via coupons, supplemental offers, contests, etc., as shown in FIG. 4.
F) Cultural Reference. Does this product placement or commercial include a cultural reference? A famous song or famous actor? Examples: 70's soul classic, modern rock top 10, Austin Powers movie, etc.
G) Sexual Overtones. Yes or no?
H) Sexually Overt or Sexually Subtle?
I) Any cross promotion taking place? For example, is the advertisement for music from a recent popular film?
J) Tone. Which sentence structure predominates? (Imperative, Interrogative, Declarative, Exclamatory, etc.)
K) Narration. Is the commercial/product placement primarily narrated or is the dialogue spoken by actors on the screen?
L) First Sentence. What is the structure of the opening sentence? (Imperative, Interrogative, Declarative, Exclamatory). Opening scene, image and music segment may also be recorded.
M) Subliminal Product Placement? (For example, a restaurant has certain brands of soft drinks appearing in the background.
N) Presentation. Push, pull, semi-push, semi-pull?
O) Intended Demographic. E.g. 21-29 male, income level $40,000+, etc., as determined generally by the advertiser.
P) Secondary Demographic.
Q) Sponsorship.
R) Sexual Orientation (Heterosexual? Homosexual? Ambiguous?)
S) Other Elements To Be Determined.

Each of the above-described elements would be entered into the media and commercial program time occurrence and content information to build a database in which almost every element in the media program is recorded and assigned a value (yes, no, present; not present, 5 seconds, one minute). This serves the primary purpose of assigning defining values to what previously was only generally interpreted, such as the tone of program or other such psychographic elements. It is this feature, among others, which will enable the present invention to be applied to many different types of media programs as will be described later in this disclosure.

Exposure elements. Exposure elements are used to ascertain whether or not a given product placement (not commercial) creates more responsiveness if it is viewed for a longer period of time. Each product placement is also considered in relation to other product placements viewed over a period of time. The reason for this is that while commercials take up a predetermined amount of time (15, 30, 45 seconds), product placements may vary greatly in time placed in a show, length placed, and ways in which a viewer can examine the product placement.

Diminishing or escalating marginal returns of responsiveness. It is clear that if you see a product placement several times one's responsiveness will suffer diminishing returns. It is possible that some shows, scenes, actors will produce more diminishing returns than others. It is also clear that the repeated placement of an ad or product placement, perhaps those products or services familiar with the viewer, e.g. Coca Cola, could increase responsiveness for a given product or service over time. The present invention is designed to look and to judge this element by monitoring the coefficient probabilities of the variables over time for repeated product placement and commercials.

Time. How long did the viewer see the product placement for? For example, a viewer watching a show might see three items available for purchase. Two items were seen for ten minutes each, while the third was seen for ten seconds. Clearly, with all other things equal, the first two items may have an advantage over the third, having received more publicity. Assume that after an artist's video is played, there is an interactive opportunity to buy the CD. A video that has been viewed three times by a consumer may have an advantage in creating responsiveness over a video that has been viewed only once. In addition, too much exposure of an ad or a product placement could result in diminishing marginal returns of responsiveness.

Spread. Time between the first showing of a product and the last showing, i.e. the maximum coverage from start to end including scenes where the product was not shown. Another factor is whether one or more of the actors referred to a given product or service in their dialogue or through their actions.

Dispersion. This is the number of times a given product placement is promoted within the total spread time it is on offer for. For example, a product placement might be shown at 3 different times, therefore any continuous viewing of that product placement is separated into 3 blocks, and the dispersion is 3.

Skew. For a given individual it may be important to recognize when the product placement is promoted during the spread. If the product placement is promoted mainly at the beginning of the spread, it is said that it was front-loaded or skewed at the front. If it is skewed at the end, it is said that it is back-ended or skewed at the back. In cases when it is dispersed evenly over the spread we can say there is minimal skew.

Concentration. This is how many uninterrupted seconds of a product are shown within the spread. In the above example (dispersion being 3) it is assumed that each block amounted to 2 minutes (amounting to 6 minutes in total) and the spread is 10 minutes. The continuous concentration amounted to 6;10ths of the spread separated equally into 3 blocks or 60%. This may also be expressed in terms of an average. For example, the average block equaled 2 minutes.

Product Placement Focus. This represents how long a product placement was on the show in relation to other product placements. For example, if there is only one product placement seen in a 1-hour block the focus is 100%; if two, the product focus is 50%.

Interactive Focus. How many interactive prompts (e.g. any flashing message or embedded image occurring over programming) inviting the viewer(s) to respond in some way via an interactive means, e.g. text message, Internet hyperlink, etc., prior to a consumer's response has he or she seen within the past 15 minute viewing block? In the preferred embodiment, every 15 minutes of an individual's viewing time is examined to determine how many interactive offers have been viewed.

These exposure variables (as well as other variables) can be measured because cable/satellite operators and set-top box manufacturers as well as a multitude of advertisers, ad agencies, media planners, etc. have the capacity to collect data on specific viewing habits and responses to interactive prompts, e.g. Internet hits to sites like www.hsbc.com/offer123 or www.specialoffer123.hsbc.com, remote control activations etc., etc.—this is an evolving process, and this information can be broken down to very small increments of time by individual viewers. For example, a cable operator is able to identify 25,000 individuals in a demographic group that watched at least 20 minutes of a particular sitcom, and the cable operator will also know what product placement opportunities and commercials those identified individuals have seen. Clearly, the more specific viewing information the cable operator provides (i.e. individual viewing habits down to the second, including channel surfing) the more accurate the consumer media reviewing actions data will be, but the present system will be useful so long as data is collected on shows viewed, ads skipped or responded to, and product placements skipped or responded to, and as this information is being gathered and collected by cable operators and set-top box manufacturers already, it is now a matter of accessing and using that data in the manner described below. However, it is important to note that the gathering of this data can be done in many different ways through many different sources, and so long as the response data and time and content information can be obtained, it does not truly matter where and how it was obtained, just that it is there. Furthermore, all of these variables, as can be seen in the attached information, can be set up on a timeline.

It is important to note that trained observers will likely be hired to monitor TV shows and commercials, and thereby assess the specific variables shown on individual TV shows and commercials. However, it is the response rates that most interest the user of the present method, e.g. website hits, remote control clicks to buy products, the ability to buy products seen on TV, broadcast on the television or the Internet. It is this data which is very important to the method of the present invention, and the actual data cable companies can provide from the set-top boxes may not be as valuable as the specific nature and identity of the end advertisers. A second database consists of a plurality of information concerning actual viewer data. This information will be derived from a third-party source such as a set-top box manufacturer, cable service operator or advertiser etc., who has the infrastructure in place to monitor viewing habits including response rates to interactive prompts, which in terms of the present invention should be understood to be any interactive feature on TV or on-line or on any media that allows response to the on-screen prompts, e.g. to order a product or service or vote. The more data the operator is able to collect, the more accurate predictions using the present invention however, there must be at least enough specific data to create representative samples for each demographic group (as defined by Nielsen company ratings, for example).

For purposes of this example, we imagine the viewing universe consists of one (1) individual. The cable operator is able to determine that this consumer watched the last twenty minutes of a particular media program, such as a sitcom, including all commercial breaks. That particular media program will have already have been broken down using the variables and values stated above on a second-by second basis or some other time increment. The cable operator, advertiser, etc. also knows that this individual has responded to two of the commercials on the show—one for more information concerning a pair of sneakers, and one for more information about a credit card. Every response, in the present invention's database, will be accompanied by a number of variables. For example, if the sneaker commercial is overtly sexual, then this variable will receive a 1. If the commercial does not feature a celebrity spokesperson, then this variable will receive a 0. (see math explanation below). If this individual happened to watch lot of television and his responses were aggregated, then by use of the method of the present invention predictions about whether he would respond to an upcoming prompt based on factors surrounding the prompt can begin to be made as follow.

The equations employed by the present invention are essentially simple and elegant. The method will observe both the factual and psychographic elements and quantify them as independent variables [Xi]. Once the method has done so it needs to predict the likelihood that each unit of such variables will impact responsiveness for groups of individuals. This likelihood is expressed as a probability co-efficient that precedes each variable [i]. To precisely determine the effects on responsiveness of these different factors, the present invention uses regression analysis. Since the accuracy of a regression model depends on the quantity of data it is based on, and the amount of data for individuals is limited by the present invention breaking down categories so minutely, it is not statistically feasible to create regression equations for each individual viewer based on their responses. Instead, the present invention will be able to easily produce regression equations that predict probability of response and show the effects of the different factors on response for whatever group of viewers a client desires. These groups would likely be the profiled groups but they could be anything—divided by city, age, income level—the client can choose.

The regression will then be a straight-forward linear model, consisting of the sum of all the commercial presentation elements and program presentation elements converted into variable multiplied by coefficients that are estimated by the classic algorithm (least squares). Since the equation is meant to predict probability of response it must produce a value between zero and one, and all of the coefficients will represent the increased expected probability of response for a viewer in that group for each unit of that variable. Most psychographic and factual variables like scene type and celebrity either exist or not, and hence will be zero/one variables.

Figure 3:
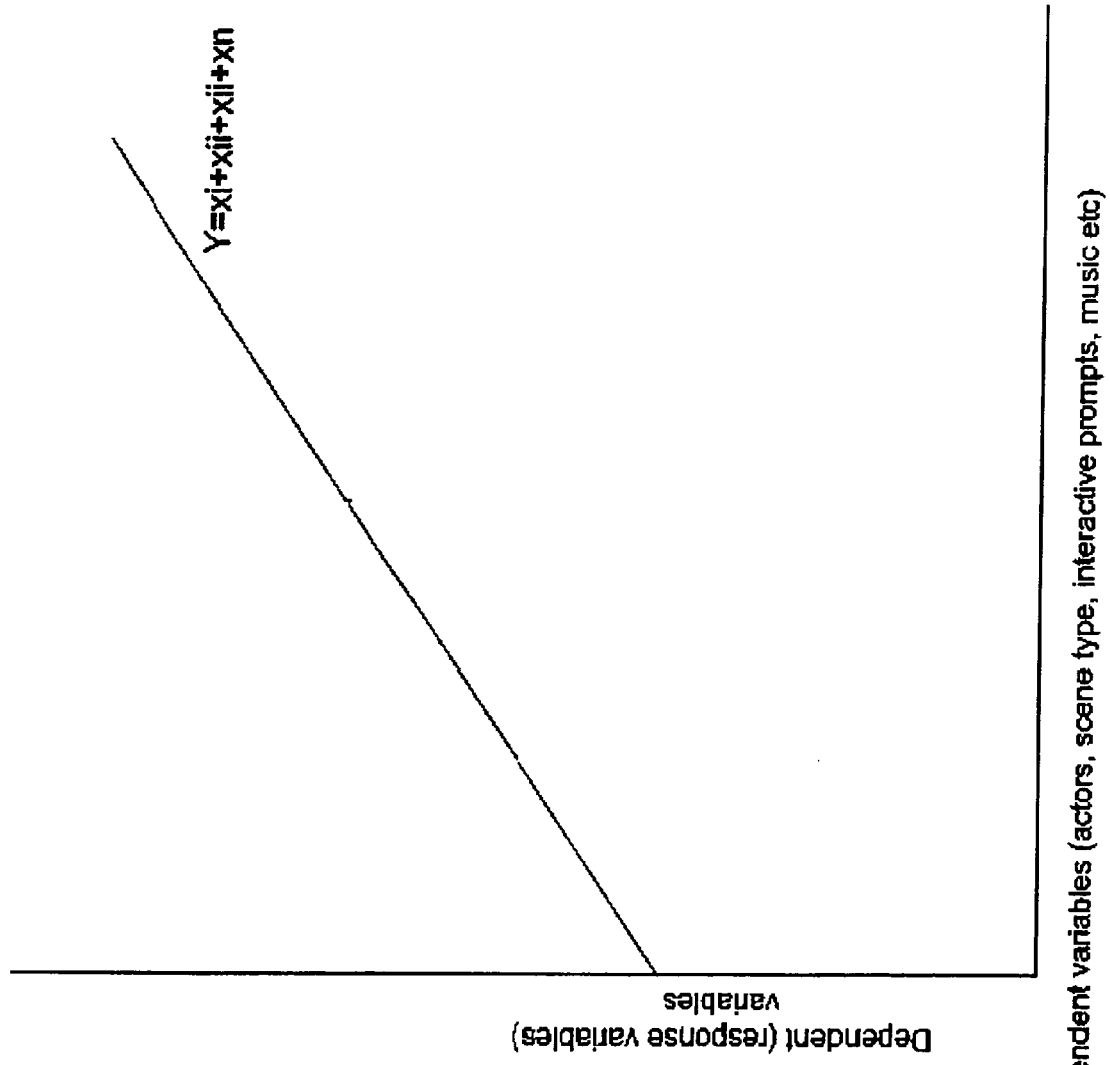
FIG. 3 is a chart showing correlations between response and psychographic content as determined via regression analysis using the method of the present invention.

An example of this simple equation is seen as the expected probability of response, such as that shown in FIG. 3 and as illustrated by the following example, as generated by the present invention in reviewing a particular program:

Expected Probability of Response=Y=0.1+0.2+ . . . +.n= (0.001*comedy+0.002*drama+0.001*action+0.005*infomercial+0.001*game show+0.001*movie+0.003*music+0.001*sports)+(0.001*normal+0.002*special episode+0.002*championship)+(0.01*upscale+0.001*lowbrow)+0.001*friend+0.001*apartment+0.01*apparel+(0.01*expensive+0.005*moderate+0.003*cheap)+0.02*primetime+0.05*November+(0.022*boom+0.02*medium+0.015*recession)+0.01*Anniston+0.005*log (time)+0.01*focus+(0.08*high show familiarity+0.05*medium+0.02*low)+(0.02*high stickiness+0.02*medium+0.04*low)+(0.001*high loyalty+0.004*medium+0.008*low)

In this simple example the first independent x variable is a comedy show. The predicted impact of one unit of this variable, i.e. the viewing of a comedic show on a pool of individuals' responsiveness is 1%. Please note: if the variable is present, i.e., the observed show is a comedy the variable will become 1; if not present, e.g. the show is a drama, the variable 'comedy' will become 0 and the product of *drama will become 0. Therefore, the first list of coefficients and variables: i.e., (0.001*comedy+0.002*drama+0.001*action+0.005*infomercial+0.001*game show+0.001*movie+0.003*music+0.001*sports) will equal (0.001*comedy) if the show is a comedy and does not fall into any other category of show. As a consequence the initial length of the first equation will be reduced considerably as variables that do not exist will become zero values. However, not all variables' will be ascribed the values 0 or 1 or some fraction thereof. For example, time will be recorded as the log of a given duration of time. Also, it should be noted that variables in the same category are grouped by parentheses.

The responsiveness probability values, on the other hand (the percentages assigned to each program element), will be based on the method's initial prediction. That is, the method's substantiated opinion as to how influential a given celebrity will be upon each additional unit of a variable, e.g. Jennifer Anniston in a scene. In time, such responsiveness probability values will be defined not by hypothesis and conjecture based on subjective interpretation, but by tested results, e.g., viewing market research data on responsiveness or actual responses to ads or product placement on interactive television including the video clips, scenes, shows shown on the Internet or any other media.

Figure 2:
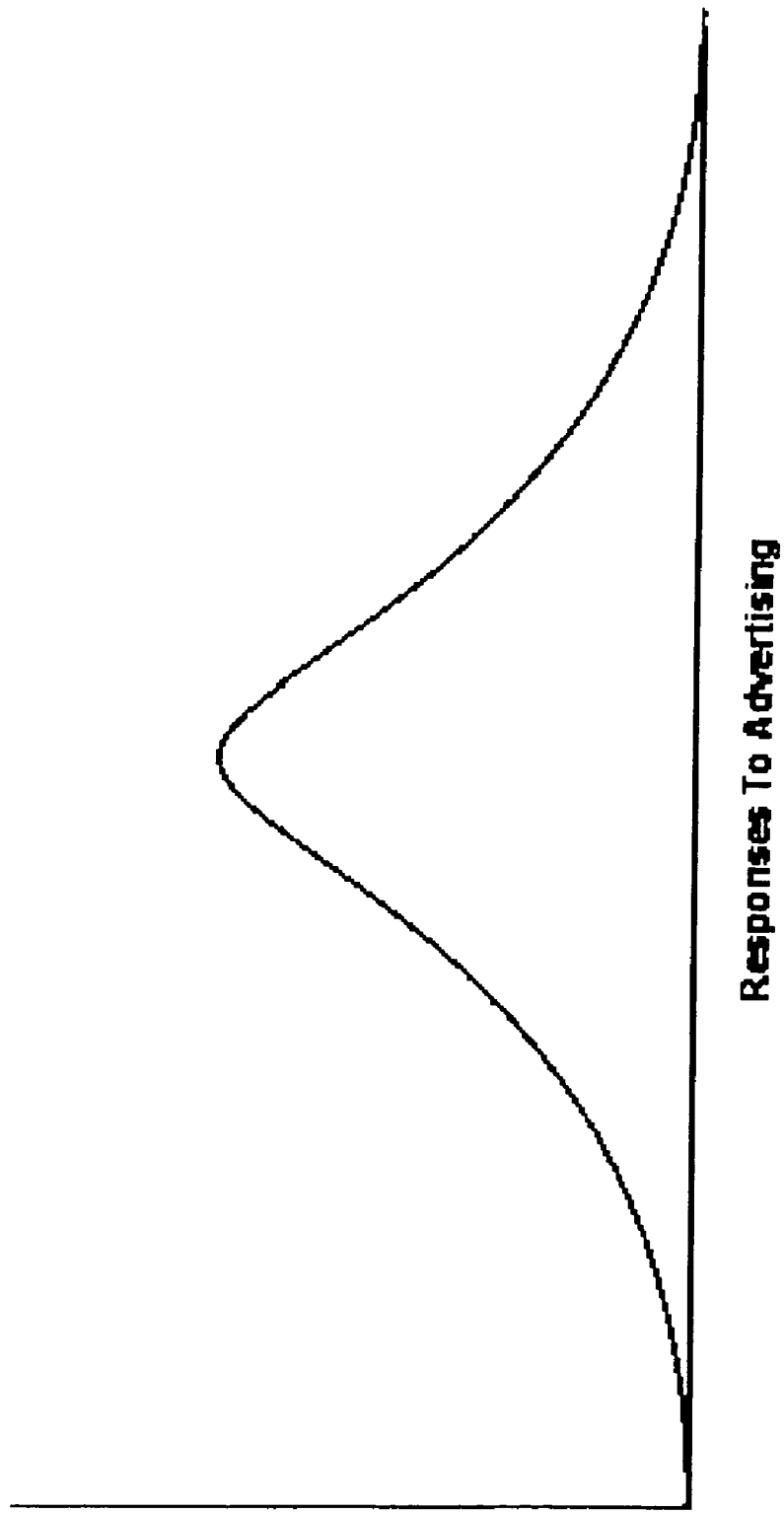
FIG. 2 is a normal distribution hypothesis for a commercial or product placement surrounding a media or television show as viewed by the present invention.

The normal distribution hypothesis for a commercial or product placement surrounding a media or television show is shown in FIG. 2 as including a generally normal bell curve where y=Population of audience members and x=Percentage of responsiveness distributed about the mean. Initially, the method of the present invention will assume a normal bell curve for the responsiveness from pools of individuals to given changes in independent variables. The assumption is that the audience is normally distributed in that a small percentage (say, 2.5%) of them will be strongly responsive to the content, i.e., will buy or inquire about something following a psychographic or factual prompt. A small percentage (2.5%) will be highly unresponsive, i.e., will not pay any attention to the scenes, characters and so. The majority, say 95% will be moderately responsive to the prompts.

In reality, the shape of the curve could look quite different. For example, the tails could be fatter or the curve could be skewed. For example, if 21-25 year old females are highly responsive to Jennifer Anniston, the curve could be skewed to the right for each scene in which she appears. This observation will inform both the method of the present invention and clients thereof that for a given unit of Jennifer Anniston (e.g. each second preceding a product placement) this demographic will be more responsive than otherwise (i.e. if the curve was normally distributed about its mean).

Say the hypothesis is that the focus would be more significant as time towards the commercial break increased, but this significance would increase greatly just before the commercial but slowly at the beginning of the segment. Then we could create a new variable, call it x for now, that equals the product of these other two variables, time towards the commercial break and focus. If x was the only variable we were using for the model it might look like this: R=0.001*x+0.1

So if a particular product placement was shown 500 seconds into the segment and the focus on the character was 0.5 (2 characters in the scene), the estimated probability of response would be 0.001*500*0.5+0.1=0.35 or 35%. This model implies that every additional second towards the commercial break increases probability of response by 0.0005 or $\frac{1}{20}^{th}$ of 1 percent. This might be true for some seconds within the segment, but not for others. If we think that the probability of response dramatically increases as the segment comes close to the commercial break or the end of the show, we have to set up the variable differently. x=(1/log(total time in segment–time into segment when commercial is shown+e))*focus, where e=Euler's constant and log is the natural log. Then the model might look like: R=0.4*x+0.1.

So if the segment is 600 seconds long and the chosen variables are shown at the 500$^{th}$ second, with a focus of 0.5, estimated response is 0.4*(1/log(600−500+e))+0.1=0.3 or 30%. For a product shown at the 598$^{th}$ second, the estimated response is 0.7 or 70%. A product shown at the 10$^{th}$ second has a 24% response and a product shown at the 100$^{th}$ second (all with the same focus) has a 25% rate. This is a model that fits with the hypothesis better, since the 98 seconds between 500 and 598 account for a 40% increase in expected response while 90 seconds at the beginning of the segment account for only a 1% increase. Still, only experimental data will show which form of modeling is most accurate and whichever turns out to be most accurate will show the insights on what accounts for responsiveness to various media program events and elements.

The method of the present invention's Linear Regression Predictions, specifically, the model as set forth below:

The regression line (or model) can be stated as: $[Y_i=a+\alpha*X_i, i=1, 2, \ldots, n]$ where Y is the response variable (also called dependent variable)—this variable determines how responsive a given pool of audience members are to the independent variables, X is the predictor (also called independent variable)—The method of the present invention will determine which independent variables are relevant subject to its model and its own empirical observations over time.

a and α are the unknown parameters—Initially, the method of the present invention will predict what these coefficients will be. They will be the expected probability of response for each unit of change in the independent variables. Over time empirical data will determine what these coefficient values will be.

is the error (also called random deviation).

Note that, Y=Pc+X is the least squares line which is an estimate of this population line. However, making predictions for individuals is unrealistic because of the amount of data necessary. Therefore, we will make predictions for whatever group of consumers a client wants, for any kind of product. For example, currently existing companies might be asked to create a specific ad for diapers that is meant to be sent to households where a grandparent lives. This ad would feature information about how grandparents can help with new babies, etc. Their entire intended viewing pool would then be plugged into the ad. The method of the present invention (including viewing history and response data) could analyze the programming circumstances and commercial factors that are most likely to create response to this category of product for this audience. Specifically, a hypothesis will be made, likely through use of a linear regression model, and based on a large amount of prior campaigns that have been successful, the actual results will be non-linear but the method of the present invention will be used to seek to identify the relevant programming and commercial variables by looking at successful campaign results over time. Then, the method of the present invention can identify times in upcoming programming where a commercial is likely to achieve greater response. The essential idea behind this invention is either to get future episodes of television shows before they air (i.e. before there is an opportunity to advertise on them) or to review past episodes of a given show so that very specific programming points can be identified that would be good opportunities for an advertiser. Example: it may be shown that when the scene location is an upper-class apartment during the twenty seconds preceding a commercial product placement, luxury automobile interactive prompts may be more likely to enjoy favorable response rates.

An advertiser, network, or other client can look at the results of any number of responses and variables. Here's a sample question:

For all shampoo advertisements, what psychographic program elements over the last six months created the highest probability of an initial response among 21-29 year olds when watching sitcoms?

This question is answered by simply using the database to filter the appropriate information. By selecting sitcom under the show type heading, you narrow the universe to all responses to all products by all demographic groups occurring on sitcoms. You subsequently select the appropriate demographic group, the appropriate time period, the appropriate product category, the appropriate level of response, and the appropriate type of elements (program elements/psychographic). The software will then automatically perform the regression analysis, and show correlations between response and psychographic content (see FIG. 3).

One can then further analyze upcoming television shows to find the points in time where these psychographic elements match the ones just discovered, to gain an advantage in placing a commercial or product, or indeed you The present invention can make suggests as to what types of things could be included in TV programming and commercials to yield the highest response rates.

Problem Solved.

The problem solved is twofold. First, advertisers need new ways to target audiences, because of two main reasons. One is because DVR-type devices allow consumers to skip commercials on recorded shows and the other is that there are so many cable channels now available, it becomes difficult for advertisers to get the kind of exposure they need. Networks are talking about charging premium rates so that consumers can skip advertisements, but advertisers are left in the lurch because they can't get exposure.

The method of the present invention solves this problem by analyzing television and identifying, through the use of multiple regression algorithms, the types of programming and exact points in the show where a specific ad will get a better response rate/skip ratio for a certain demographic group.

The second problem solved is the need for networks to determine which types of shows create responsiveness. Because consumers are skipping advertisements, networks and other media providing companies lose money because the price of media space drops. Therefore, networks are beginning to offer product placements on a variety of television shows, and are also starting to use enhanced advertising to better target interested consumers. The present invention is designed to help them to gauge how their programming will affect response, and what kind of response they might get for certain kinds of commercials/product placements on certain shows. For example, it will also help them analyze how much responsiveness their celebrities create, which in turn will help them cast appropriate actors in appropriate shows.

The method of the present invention addresses a key issue which the previously mentioned prior art systems have overlooked. The biggest difference between the internet and television is the fact that television undeniably has a greater impact, culturally, on the mass public; at least as far as products are concerned. For instance, a company trying to appeal to a young crowd advertises on MTV for two reasons; because MTV has the highest number of these viewers, and because these viewers identify with the station's programming—it is part of their lifestyle. That advertiser then will place their advertising on MTV hoping to trade off of this already existing connection thus forging connections of their own with their intended consumer.

Unfortunately, this is where prior art services fall short. Their software is based on an internet model, where the influence of a "branded" website (like a Nike website, for example) is much less influential. They classify consumers by which types of programs they watch or what their profile is in an attempt to send them more appealing offers, just like they classify consumers based on the kind of websites they visit. However, the method of the present invention teaches that the influence of the programming content and commercial content itself is largely responsible for creating responsiveness among the public, not simply who is watching the program. For example, if a major star changes her hairstyle on a popular show, it is not uncommon for this to spark a trend of copycat styles, which may influence new trends in hair care products. Rather than simply identify the type of programs a consumer watches, the method of the present invention examines what happens during the program itself. The contention of the present method is that the presence of certain stars, types of characters, and scene types, along with show types, etc., etc., etc., may be responsible for creating responsiveness in certain groups of viewers.

Basically, the present method analyzes three considerations. One, the nature of the commercial content itself, two, the nature of the programming surrounding the commercial or product placement, and three, the response or skip rates of a given demographic group. By correlating response/skip rates with commercial types and content, both advertisers and networks are given a unique advantage. Advertisers using our system can not only target consumers by show, or type of show or scene etc., but by a specific time on a specific show. How? Because some television shows/clips/segments are produced months before media buys occur. By partnering with networks and other companies, the present method can analyze those shows and determine not only the most appropriate shows or media video clips that a given advertiser should advertise on, and what media to advertise on, but the precise points where the ad should go. Here's a simple example—it can be illustrated that responses to vacation offers are highest among 21-29 year old males with an income level of x when the preceding ten minutes of programming includes a high percentage of sexual references. (Hypothetically, we have already entered any incidences of sexual references in the future season of television shows.) By showing a correlation between sexual scenes and vacation responses, we offer advertisers a significant advantage to travel services making media buys. By definition, there will exist causal relationships between viewer responses or skips and programming content, with the degree of that causality varying with the content itself and other variables which may be addressed through the present invention, and the present invention seeks to identify and profit from that information, once it is assembled and interpreted.

This also creates an advantage for networks and companies that broadcast shows or video clips on any medium, e.g. the Internet or those who select what shows to advertise on, because the method of the present invention is the only system that will specifically analyze the relationship between the presence of celebrities, characters, scene types and show types and so on and the responses or skips to commerce opportunities on television. This will help networks and other broadcasters as well as advertisers determine the kind of programming that may be responsible for creating responsiveness. It may help them choose between shows that are possibilities for being dropped. For example, it is possible that a show with a low audience rating might have a highly responsive audience that is more impressive and influential than its initial numbers might suggest. By way of an example, it may help them decide which celebrities to put in new or old reruns of shows. This is quite relevant because future television shows will be judged not only by how many viewers watch, but how many respond.

Also, the present method is unique in that it can help advertisers actually create the most effective message. Program including film content and commercials are categorized in a number of ways, and by analyzing the relationship between these categories and viewer responses, advertisers can create a more effective message. Also, because of the searchable database, advertisers will be able to analyze and customize trends occurring in advertising, including looking at competitors' commercials and responses, general response for category types, etc. over time. Here's an example—a shampoo company trying to appeal to 21-29 year-old women is looking for a celebrity spokesperson to appear in their ad. By using our database, they can identify the celebrity who has the highest probability of creating response among the targeted viewing group.

Also, we gauge the effect of "exogenous" variables on consumer response. As time goes on and massive amounts of data are collected, the ability to show correlations and causality between response and seemingly unrelated events will increase. A more direct exogenous variable would be A) the presence of a guest star. Who was it? and do shows with guest stars get more response from certain demographic groups for certain products? An indirect exogenous variable would be B) the Dow Jones index or the overall marginal propensity to consume or MPC. Is there a relationship between trends in the stock market or MPC and trends in responsiveness?

Finally, both advertisers and networks or other broadcasters on any media are given a chance to value the overall appeal of their commercial for a specific group. Because of our unique "rating" system, we can determine which part of responsiveness is due to the commercial's presentation and characteristics, and which part is due to the strength of the show that the commercial was on. This is a number called "residual brand awareness" and represents, for each commercial and product placement, the total value of all programming elements, e.g. x variables dealing with programming elements, surrounding the commercial or product placement, expressed as a number. For example, a commercial may exist on a show that exhibits properties which, in the past, have not been shown to create responsiveness. If this commercial gets a large response, the makeup of the commercial itself can be compared to the surrounding factors. This way, advertisers can determine "brand strength", and can choose strategic times (i.e. media buys) to maximize it. The value of all product or commercial x variables (again, the total combined probability that these variables add to the chance that members of a demographic group will respond to a given offer) is represented as a number called "product brand awareness".

Figure 5:
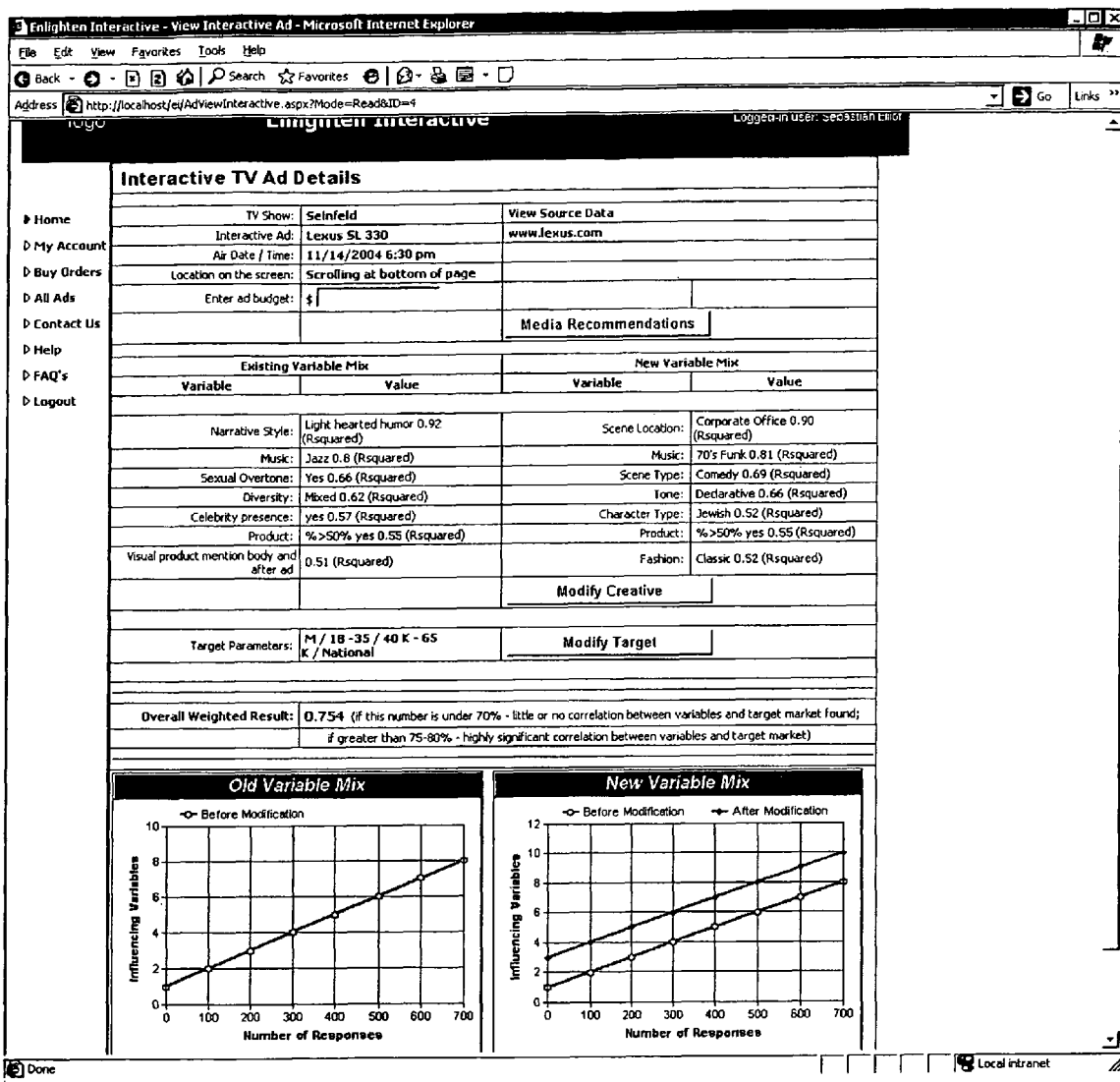
Figure 6:
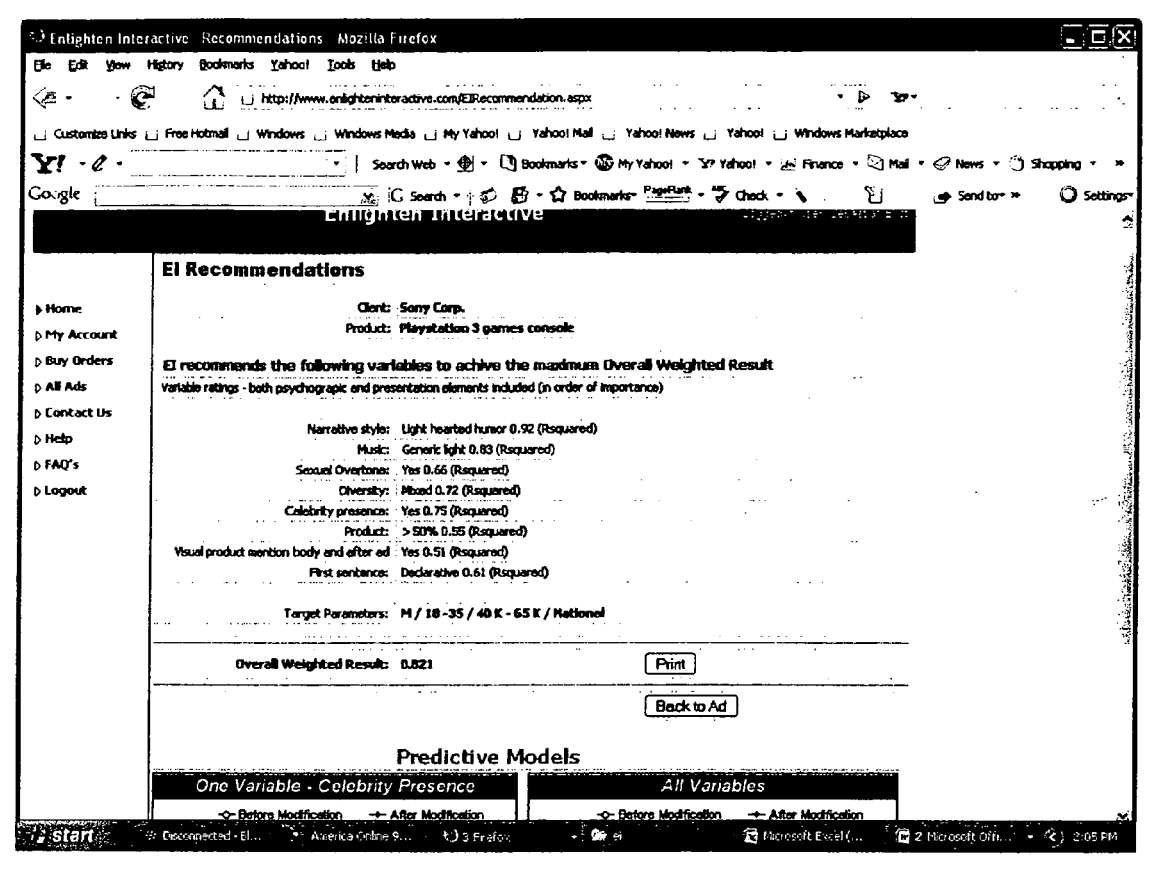
Figure 7:
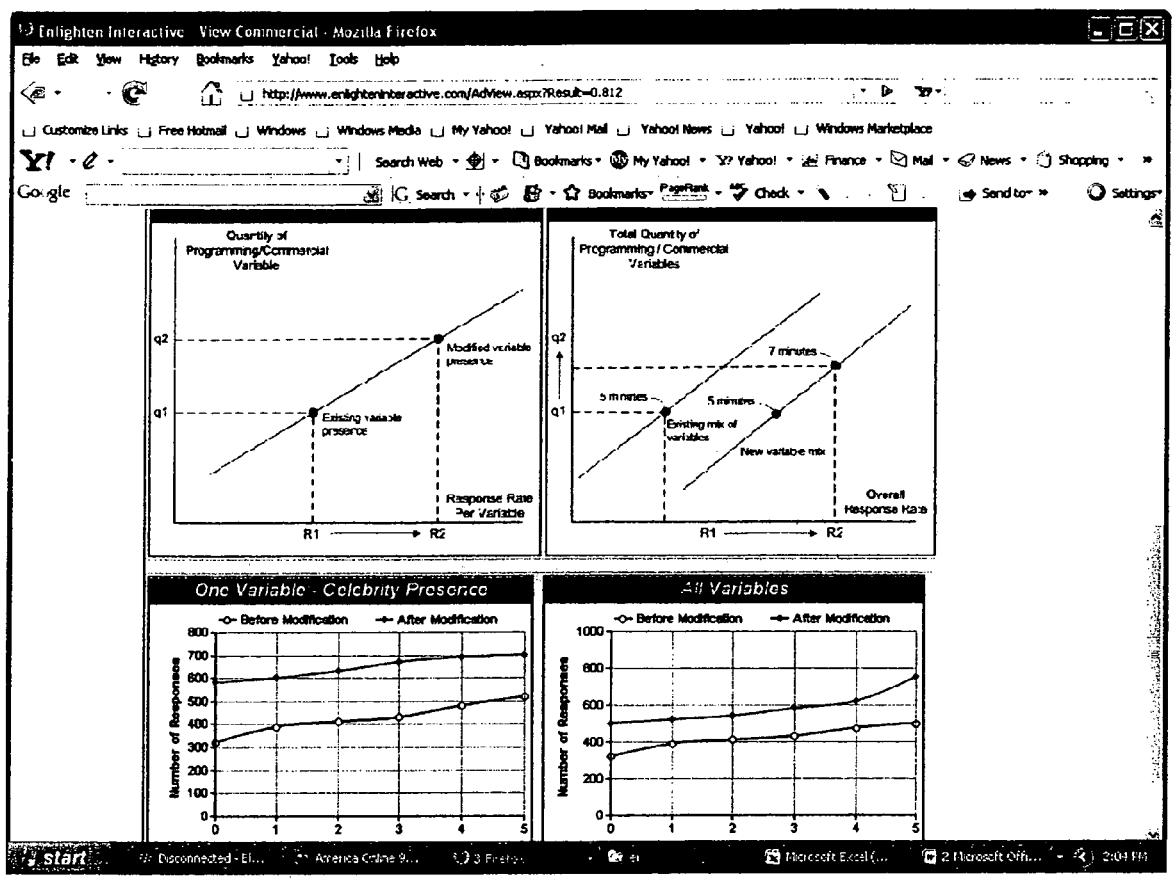

FIGS. 5, 6 and 7 illustrate screen shots of the computer-based software which utilizes the present invention, and are provided primarily for illustrative purposes, but it should be noted that the variable elements and Interactive TV Ad details shown thereon may be modified or changed to achieve desired results. It should also be noted that the overall weighted result obtained by the addition of all factors is shown in FIG. 5, and simple calculation of this result is obtained via the programmed software which adds all of the variable factors as was described previously in this disclosure.

There are other ways in which x variables are manipulated to gauge different elements of responsiveness. For example, brand loyalty discusses how one might predict the probability of a given group responding to an offer from a new or unfamiliar brand. Also, measures that are based on the amount of time it takes for a consumer to respond to an offer are contemplated, specifically measuring what is referred to as impulsivity. Finally, the definitions of psychographic and factual may differ at points in the interpretation and categorization of the program elements, however, this disclosure represents the best mode of practicing the invention currently known.

It should also be noted that the present invention will bring much-needed accountability to the advertising industry, in that the results from an advertisement can be gauged far more precisely than merely determining the amount of advertised product sold. The present invention provides a direct correlation between content and consumer response, so the remote and sometimes tenuous connection of advertisement to sales may be significantly supplemented by use of the present invention.

A further important aspect of the present invention is that, as discussed previously, it is usable with virtually any media or commercial content or distribution system, including Internet and Web-based advertisements, video games for consoles and PCs and virtually any other type of sensory-based advertising medium. It is expected that as the speed and availability of Internet connections increases, the amount of advertising found on the Internet will also increase, and it is expected that the method of the present invention will be available for use with this expanding medium, and such uses should be understood to be a part of this disclosure. It cannot be overemphasized that the present invention may be used in connection with virtually any advertising medium, and therefore the present invention will be able to be applied to advertising regardless of the technological advances in the broadcast medium. Finally, it should be noted that the new wave of interactive advertising is perfectly suited to use with the present invention, as generally immediate responsiveness and determination of advertising effectiveness is a primary component of the present invention, and such can be used to immediately modify interactive advertising in an almost real-time format.

There has therefore been shown and described a method of determining correlations and causality between media program content and consumer responsiveness which accomplishes at least all of its intended objectives.

We claim:

1. A method of determining correlations and causality between media program content and consumer responsiveness comprising the steps;

providing a computer having a processor, software, a first database and a second database;

identifying the occurrence of program elements and product placement elements at specified time intervals within a first episode of a serialized media program with the computer via the software;

storing the occurrence of program elements and product placement elements at specified time intervals within the first episode of a serialized media program in the first database;

detecting consumer media reviewing actions in connection with said program elements and product placement elements within the first episode of a serialized media program via consumer media reviewing detector means operative to selectively detect consumer media reviewing actions;

storing consumer media actions in connection with said program elements and product placement elements within the first episode of a serialized media program in the second database;

correlating said program elements and product placement elements within the first episode of a serialized media and said consumer media reviewing actions by the processor to obtain and assign responsiveness probability values corresponding to type and intensity of consumer response for each of said program elements and product placement elements; and utilizing said responsiveness probability values in connection with said program elements and product placement elements to obtain determinable probabilities of creating responsiveness among persons receiving said media content, whereby said probabilities are graphically represented.

2. The method of claim 1 further comprising the step of applying said responsiveness probability values to program elements and product placement elements in a second media program to predict consumer media reviewing actions in response to said program elements and product placement elements in said second media program.

3. The method of claim 2 further comprising placing an advertisement within said second media program at a specific time within specific content therein as determined by said application of said responsiveness probability values to said program elements and product placement elements in said second media program.

4. The method of claim 1 wherein said specified time intervals is every second.

5. The method of claim 4 wherein said consumer media reviewing actions are collected via at least one of a set-top box manufacturer, cable service operator and advertiser operative to monitor and record viewer viewing habits including response rates to interactive prompts.

6. The method of claim 1 wherein said step of correlating said program elements and product placement elements and said consumer media reviewing actions to obtain and assign responsiveness probability values corresponding to type and intensity of consumer response further comprises examining the positive and negative viewer responses and the intensity of those positive and negative viewer responses to each of said program elements and product placement elements, then assigning a percentage value between 0% and 100% as said responsiveness probability value corresponding to said consumer media reviewing actions thereby assigning a probability value to each element whereby probability of creating responsiveness among certain groups is mathematically represented.

7. The method of claim 1 wherein said step of applying said responsiveness probability values to program elements and product placement elements in a second media program further comprises examining each of said program elements and product placement elements in the second media program, applying the responsiveness probability value corresponding to each of said program elements and product placement elements in the second media program thereto and calculating a total expected responsiveness probability value by adding each of said applied responsiveness probability values whereby the expected probability of creating responsiveness among certain groups in response to the second media program is mathematically represented.

8. A method of determining correlations and causality between media program content and consumer responsiveness comprising the steps;

providing a computer having a processor, software, a first database and a second database;

identifying the occurrence of program elements and product placement elements at specified time intervals within a first episode of a serialized media program with the computer via the software;

storing the occurrence of program elements and product placement elements at specified time intervals within the first episode of a serialized media program in the first database;

detecting consumer media reviewing actions in connection with said program elements and product placement elements within the first episode of a serialized media program via consumer media reviewing detector means operative to selectively detect consumer media reviewing actions;

storing consumer media actions in connection with said program elements and product placement elements within the first episode of a serialized media program in the second database;

correlating said program elements and product placement elements within the first episode of a serialized media program and said consumer media reviewing actions by the processor to obtain and assign responsiveness probability values corresponding to type and intensity of consumer response for each of said program elements and product placement elements;

examining the positive and negative viewer responses and the intensity of those positive and negative viewer responses to each of said program elements and product placement elements;

assigning a percentage value between 0% and 100% as said responsiveness probability value corresponding to said consumer media reviewing actions thereby assigning a probability value to each element whereby probability of creating responsiveness among certain groups is mathematically represented;

applying said responsiveness probability values to program elements and product placement elements in a second episode of a serialized media program to predict consumer media reviewing actions in response to said program elements and product placement elements in said second episode of a serialized media program; and placing an advertisement within said second episode of a serialized media program at a specific time within specific content therein as determined by said application of said responsiveness probability values to said program elements and product placement elements in said second episode of a serialized media program.

9. The method of claim 8 wherein said program elements and product placement elements is stored in a respective one of a program content information database and a product placement information database.

10. The method of claim 9 wherein said media and commercial program time occurrence and content information is collected via at least one of a set-top box manufacturer, cable service operator and advertiser operative to monitor and record viewer viewing habits including response rates to interactive prompts.

11. The method of claim 8 wherein said step of applying said responsiveness probability values to program elements and product placement elements in a second media program further comprises examining each of said program elements and product placement elements in the second media program, applying the responsiveness probability value corresponding to each of said program elements and product placement elements in the second media program thereto and calculating a total expected responsiveness probability value by adding each of said applied responsiveness probability values whereby the expected probability of creating responsiveness among certain groups in response to the second media program is mathematically represented.

12. A method of determining correlations and causality between media program content and consumer responsiveness comprising the steps;

providing a computer having a processor, software, a first database and a second database;

identifying the occurrence of program elements and product placement elements at specified time intervals within a first episode of a serialized media program with the computer via the software;

storing the occurrence of program elements and product placement elements at specified time intervals within the first episode of a serialized media program in the first database;

detecting consumer media reviewing actions in connection with said program elements and product placement elements within the first episode of a serialized media program via consumer media reviewing detector means operative to selectively detect consumer media reviewing actions;

storing consumer media actions in connection with said program elements and product placement elements within the first episode of a serialized media program in the second database;

correlating said program elements and product placement elements within the first episode of a serialized media program and said consumer media reviewing actions by the processor to obtain and assign responsiveness probability values corresponding to type and intensity of consumer response for each of said program elements and product placement elements;

applying said responsiveness probability values to program elements and product placement elements in a second episode of a serialized media program to predict consumer media reviewing actions in response to said program elements and product placement elements in said second episode of a serialized media program; and placing an advertisement within said second episode of a serialized media program at a specific time within specific content therein as determined by said application of said responsiveness probability values to said program elements and product placement elements in said second episode of a serialized media program.

13. The method of claim 12 wherein said program elements and product placement elements within the first episode of a serialized media program is stored in a respective one of a program content information database and a product placement information database.

14. The method of claim 13 wherein said program elements and product placement elements within the first episode of a serialized media program is collected via at least one of a set-top box manufacturer, cable service operator and advertiser operative to monitor and record viewer viewing habits including response rates to interactive prompts.

15. The method of claim 12 wherein said step of correlating said program elements and product placement elements within the first episode of a serialized media program and said consumer media reviewing actions to obtain and assign responsiveness probability values corresponding to type and intensity of consumer response further comprises examining the positive and negative viewer responses and the intensity of those positive and negative viewer responses to each of said program elements and product placement elements within the first episode of a serialized media program, then assigning a percentage value between 0% and 100% as said responsiveness probability value corresponding to said consumer media reviewing actions thereby assigning a probability value to each element whereby probability of creating responsiveness among certain groups is mathematically represented.

16. The method of claim 12 wherein said step of applying said responsiveness probability values to program elements and product placement elements in a second episode of a serialized media program further comprises examining each of said program elements and product placement elements in the second episode of a serialized media program, applying the responsiveness probability value corresponding to each of said program elements and product placement elements in the second episode of a serialized media program thereto and calculating a total expected responsiveness probability value by adding each of said applied responsiveness probability values whereby the expected probability of creating responsiveness among certain groups in response to the second episode of a serialized media program is mathematically represented.

17. The method of claim 8 wherein the specified time interval is every second.

18. The method of claim 1 further comprising correlating said timing of program elements and product placement elements with said consumer media reviewing actions.

19. The method of claim 1 further comprising correlating said program elements and said timing of product placement elements with said consumer media reviewing actions.

20. The method of claim 12 wherein the specified time interval is every second.

* * * * *